United States Patent [19]

Estaque

[11] Patent Number: 4,745,317
[45] Date of Patent: May 17, 1988

[54] ARMATURE ROTORS FOR ELECTROMAGNETIC RETARDERS

[75] Inventor: Michel Estaque, Taverny, France

[73] Assignee: Labavia-S.G.E., France

[21] Appl. No.: 42,118

[22] Filed: Apr. 24, 1987

[30] Foreign Application Priority Data

Apr. 30, 1986 [FR] France .................. 86 06280

[51] Int. Cl.⁴ .................. H02K 49/00; F16D 65/27
[52] U.S. Cl. .................. 310/105; 188/264 AA; 416/186 R
[58] Field of Search .......... 188/164, 264 A, 264 AA, 188/267, 218 XL; 310/60 R, 93, 105; 416/3, 186, 187

[56] References Cited

U.S. PATENT DOCUMENTS 3,394,780  7/1968  Hodkinson .............. 188/264 A
3,871,466  3/1975  Bessière ................ 310/93

FOREIGN PATENT DOCUMENTS 2233742  1/1975  France ................... 310/105
53-38627 10/1979  Japan .................... 188/264 A
834847   5/1960  United Kingdom ........... 310/105

Primary Examiner—Patrick R. Salce
Assistant Examiner—D. L. Rebsch
Attorney, Agent, or Firm—Larson & Taylor

[57] ABSTRACT

An armature rotor for an electromagnetic retarder includes at least one disk (2) made from a ferromagnetic material connected to an inner fixing ring (7) by an annulus of arms (9) forming ventilation fins, the largest diameter portions of these arms projecting axially from the face of the disk opposite the air gap (E), and the crests of these portions being joined together by an annular web (10), the assembly formed by the disk, the ring, the arms and the web being formed of a single molded block. The maximum outer diameter of the ventilation stucture formed by the arms and the web is greater than the outer diameter of the disk, considered at the level of the mean plane of this disk. Two thin collars (13 and 14) defining therebetween a groove (15) extend the two axial faces of the disk radially outwardly.

9 Claims, 1 Drawing Sheet

U.S. Patent May 17, 1988 4,745,317

ARMATURE ROTORS FOR ELECTROMAGNETIC RETARDERS

The invention relates to armature rotors for electromagnetic retarders, particularly for motor vehicles, which rotors include at least one disk made from a ferromagnetic material securable to the shaft to be slowed down and adapted to travel past a stator ring of alternately positive and negative electromagnetic poles, from which it is separated only by an air gap, this disk being then braked and heated because of the creation of eddy currents in its mass.

It relates more particularly, among these rotors, to those whose disk is connected to an inner fixing ring by means of an annulus of arms forming ventilation fins, the largest diameter portions of these arms projecting axially from the face of the disk opposite the air gap, and the crests of these portions being joined together by an annular web, the assembly formed by the disk, the ring, the arms and the web being formed as a single molded block, preferably from steel.

The removal of the heat generated in the disk of such a rotor by the eddy currents, during use of the retarder equipped with such a rotor, takes place essentially by conduction towards the web through the arms and by radiation and convection from the disk, the arms and the web, this latter phenomenon being greatly reinforced by ventilation: in fact, the rotor then plays the role of a fan by sweeping a stream of cooling air over the hot surfaces of the disk, the arms and the web, which surfaces then define channels for said air stream.

In known embodiments of rotors of the above kind, the annular ventilation structure formed by the arms and the web has an outer diameter at most equal to that of the disk to which it is joined.

As for the disk itself, it is formed by a relatively thick washer having a constant or practically constant thickness over the whole of its extent and the outer diameter of this washer is generally equal to that of the annulus of stator poles in front of which it travels.

It may in fact seem ill-advised to extend this disk radially outwardly beyond this annulus of poles, the annular portion of the disk which extends radially beyond the air gap being then badly used magnetically.

It follows from the foregoing that, in known embodiments, the outer diameter of the ventilation structure is relatively small.

The aim of the invention is to improve the cooling of the rotor disks of the kind in question during their operation, which increases the amount of torque generated, when hot, by the corresponding retarders.

For this, the rotors of the kind in question, in accordance with the invention, are essentially characterized in that the outer diameter of their ventilation structure formed by the arms and the web is greater than the outer diameter of the disk, which diameter is considered at the level of the mean plane of this disk.

In preferred embodiments, recourse is further had to one or another of the following arrangements:

the portion of the disk situated axially on the side where the ventilation structure is located, is extended radially by a projecting collar thinner than the disk, the portion of the disk situated axially on the side where the air gap is located is extended radially by a projecting collar thinner than the disk, in a rotor according to one of the two preceding paragraphs, each projecting collar is tapered down towards its periphery, the difference between the outer maximum diameter of the ventilation structure and the outer diameter of the disk at the level of its mean plane is between 2 and 5% of said maximum diameter.

Apart from these main arrangements, the invention comprises certain other arrangements which are preferably used at the same time and which will be more explicitly discussed hereafter.

In what follows, a preferred embodiment of the invention will be described with reference to the accompanying drawings, in a way which is of course in no wise limitative.

FIG. 1 of these drawings shows in axial half section an electromagnetic retarder rotor constructed in accordance with the invention, a portion of the corresponding stator also being shown.

Figure 1:
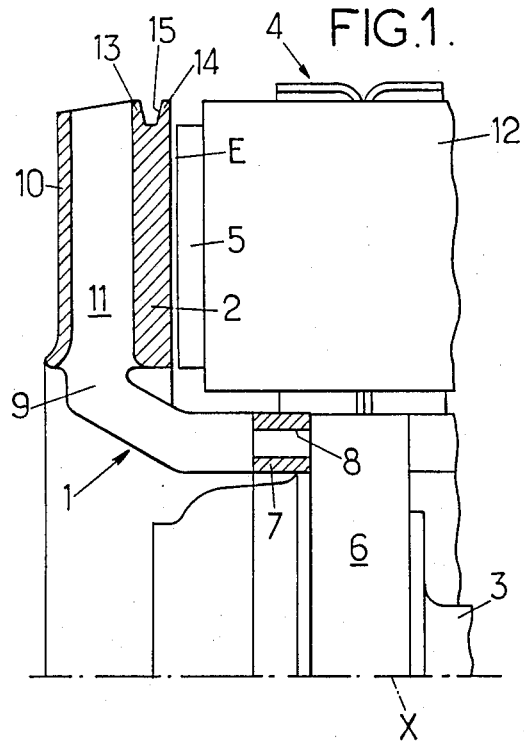

The word "rotor" used in the present text designates more precisely each of the monobloc subassemblies 1 forming part of the rotor assembly with axis X of an electromagnetic or "eddy current" retarder and which includes an armature disk 2 formed by a relatively thick and flat washer made from a ferromagnetic material.

As is known, such a disk 2 is secured to the shaft 3 to be slowed down, such as the drive shaft of a vehicle, and it is mounted so as to be able to travel in front of the stator 4 of the retarder, or more precisely in front of an annulus of alternatively positive and negative inductor poles 5 forming part of the stator, with interpositioning of an air gap E, the disk 2 in question then being the seat of eddy currents which result in braking and heating of this disk.

The rotor assembly of the retarder includes, in addition to the above defined rotor or subassembly, which is a single unit or preferably split symmetrically on each side of the stator, an intermediate piece 6 of revolution about axis X, such as a sleeve, hub or plate, itself fixed generally by bolting to the shaft 3 to be slowed down, each "rotor" 1 here being in turn fixed by bolting to this intermediate piece.

In a way also known per se, each rotor 1 includes, in addition to the disk 2, and integrally molded with this disk:

a fixing ring 7 of mean diameter less than the inner diameter of disk 2, formed with axial bores 8, threaded or not, for receiving bolts (not shown) fixing this ring to the intermediate piece 6, an annulus of arms 9 forming ventilation fins and projecting from the face of disk 2 opposite its face intended to define the air gap E, these arms being extended towards axis X so as to connect the disk to ring 7, and an annular rim or web 10 extending generally parallel to the disk and connecting the crests of the largest diameter portions of arms 9 so as to form channels 11 between these portions, the disk and the web guide, for the ventilation air.

Seen in cross section, arms 9 are slanted and preferably curved rearwardly with respect to the direction of rotation of the rotor, if we consider the increasing radii.

In axial section, these arms 9 could be "straight", their mean lines then remaining substantially contained in the same transverse plane.

Preferably, however, these arms 9 are bent axially, as in the embodiment shown in FIG. 1, so as to "indent" ring 7 axially inside the stator and thus reduce the axial space required by the central portion of the rotor.

Arms 9 are advantageously completed by complementary fins (not shown) interposed circumferentially between these arms and axially between the disk and the web, the form of each fin being practically identical to that of the portion of each arm interposed between the disk and the web.

These fins are integrally molded with the rest of the rotor and are advantageously eight or sixteen in number in the preferred case where the number of arms is equal to eight.

In known embodiments, the maximum diameter D (FIG. 2) of the ventilation structure formed by the arms, the fins, the web and possibly the portions of the disk adjacent the arms and the fins is at most equal to the outer diameter d of the disk, which diameter is considered at the level of the mean plane of this disk, that is to say at the level of the middle of its axial thickness.

In other words, in these known embodiments, the largest diameter of the rotor is diameter d and it is the disk itself which defines the transverse space required by the rotor.

In addition, in said embodiments, the diameter d in question is generally equal to the diameter p of the annulus of stator poles 5.

It may in fact seem unwise to give this diameter d a value greater than p because the only portion of the disk which is correctly used magnetically is the one which is situated axially facing the air gap E.

Figure 3:
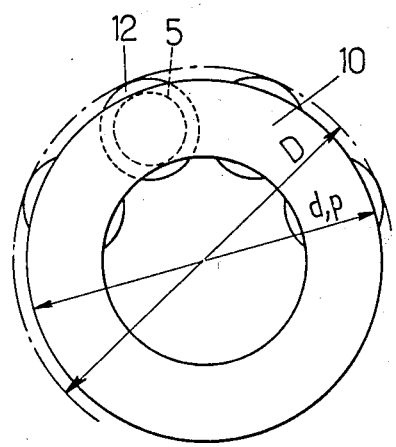
FIG. 3 is a partial end view of a rotor-stator assembly of the above kind, shown for explanatory purposes.

For these different reasons, the diameter d has been up to now relatively small and generally limited to that of the annulus of poles p, as can be seen in FIG. 3.

Now, the applicant has discovered that the transverse space required by the retarder was determined not by the disk itself but by the coils 12 of electric wire which surround ferromagnetic material cores and form, with these cores, poles 5, and that it was therefore possible to slightly increase the diameter D of the ventilation structure without, for all that, increasing the diameter d of the disk such as defined above.

This increase in diameter D without increasing the diameter d has the following advantages:

it does not increase the overall transverse dimension of the retarder, it only very slightly inceases the weight of the rotor, since the increase in diameter concerns only thin continuous peripheral portions of said rotor and not the thick continuous portion alone of this rotor, namely the disk, finally, and especially, it considerably improves the ventilation and so the removal of the heat generated in the disk by the creation of eddy currents because the peripheral ventilation annulus thus added to the rotor concerns the largest diameters and so the largest peripheral extent of the rotor.

Finally, the above defined arrangement improves the efficiency of the retarder when hot, all other things being equal.

Figure 2:
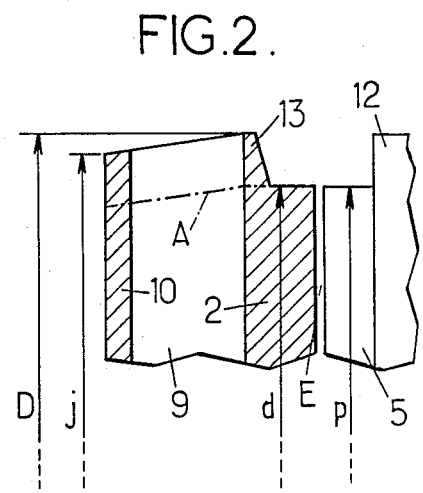
FIG. 2 shows in partial axial half section a variant of a rotor-stator assembly, on a larger scale.

As can be seen in FIGS. 1 and 2, the additional portion of the ventilation structure may include a thin collar 13 extending radially outwardly the portion of disk 2 which is situated axially on this ventilation structure side.

Furthermore, as can be seen in FIG. 1 which relates to a preferred embodiment, the rotor may include a second collar 14 extending radially outwardly the portion of disk 2 which is situated axially on the air gap E side.

The periphery of this disk 2 is then defined by a radially outwardly open groove 15.

One and/or the other of collars 13 and 14 is preferably tapered down towards its periphery: its axial half section is then advantageously that of a right angled trapezium.

As in prior embodiments, the periphery of the fictitious envelope of the ventilation structure is advantageously given a truncated cone shape converging outwardly of the retarder: in other words, the outer diameter j of web 10 is smaller than the maximum diameter D of the structure, which diameter is then that of collar 13.

By way of comparison, there is shown with a dash dot line at A in FIG. 2, the truncated cone shaped profile of the fictitious envelope of the ventilation structure forming part of a prior rotor.

By way of illustration, and of course in no wise limitative of the invention, in one embodiment thereof having given every satisfaction and in which the diameter D was of the order of 500 to 550 mm, the difference D−d was of the order of 15 to 20 mm.

More generally, the ratio between the dimensions D−d and D is preferably between 2 and 5%.

Following which, and whatever the embodiment adopted, an electromagnetic retarder rotor is finally obtained whose construction and advantages follow sufficiently from the foregoing.

As is evident, and as it follows moreover already from what has gone before, the invention is in no wise limited to those of its modes of application and embodiments which have been more especially considered; it embraces, on the contrary, all variants thereof.

I claim:

1. An armature rotor for an electromagnetic retarder, including at least one disk made from a ferromagnetic material connected to an inner fixing ring by an annulus of arms forming ventilation fins, the largest diameter portions of these arms projecting axially from the face of the disk opposite the air gap, and the crests of these portions being joined together by an annular web, the assembly formed by the disk, the ring, the arms and the web being formed of a single molded block, characterized in that the maximum outer diameter of the ventilation structure formed by the arms and the web is greater than the outer diameter of the disk, considered at the level of the mean plane of this disk.

2. The rotor according to claim 1, characterized in that the portion of the disk situated axially on the side where the ventilation structure is located, is extended radially by a projecting collar thinner than the disk.

3. The rotor according to claim 1, characterized in that the portion of the disk situated axially on the side where the air gap is situated is extended radially by a projecting collar, thinner than the disk.

4. The rotor according to claim 2, characterized in that the portion of the disk situated axially on the side where the air gap is situated is extended radially by a projecting collar, thinner than the disk.

5. The rotor according to claim 2, characterized in that the projecting collar is tapered down towards its periphery.

6. The rotor according to claim 3, characterized in that the projecting collar is tapered down towards its periphery.

7. The rotor according to claim 4, characterized in that each projecting collar is tapered down towards its periphery.

8. The rotor according to claim 7, characterized in that the axial half section of each projecting collar has the form of a right angled trapezium.

9. The rotor according to claim 1, characterized in that the difference between the outer maximum diameter of the ventilation structure and the outer diameter of the disk at the level of its mean plane is between 2 and 5% of said maximum diameter.

* * * * *